(12) United States Patent
Mathi et al.

(10) Patent No.: US 10,252,862 B2
(45) Date of Patent: Apr. 9, 2019

(54) PICKING STATION FOR PICKING ARTICLES INTO ORDER CONTAINERS AND CONVEYOR BAGS FOR ORDER AND BATCH PICKING

(71) Applicant: KNAPP AG, Hart bei Graz (AT)

(72) Inventors: Franz Mathi, Gleisdorf (AT); Thomas Johaim, Graz (AT); Peter Stock, Aschaffenburg (DE)

(73) Assignee: KNAPP, AG, Hart bei Graz (AT)

( * ) Notice: Subject to any disclaimer, the term of this patent is extended or adjusted under 35 U.S.C. 154(b) by 0 days.

(21) Appl. No.: 15/753,532

(22) PCT Filed: Aug. 17, 2016

(86) PCT No.: PCT/AT2016/060029
§ 371 (c)(1),
(2) Date: Feb. 19, 2018

(87) PCT Pub. No.: WO2017/027896
PCT Pub. Date: Feb. 23, 2017

(65) Prior Publication Data
US 2018/0251303 A1   Sep. 6, 2018

(30) Foreign Application Priority Data
Aug. 19, 2015 (AT) ............... GM246/2015 U

(51) Int. Cl.
| | |
|---|---|
| *B65G 1/137* | (2006.01) |
| *B65B 35/44* | (2006.01) |
| *B65G 13/02* | (2006.01) |
| *B65G 17/20* | (2006.01) |
| *B65G 47/90* | (2006.01) |

(52) U.S. Cl.
CPC ............ *B65G 1/1378* (2013.01); *B65B 35/44* (2013.01); *B65G 13/02* (2013.01); *B65G 17/20* (2013.01); *B65G 47/905* (2013.01); *B65G 2201/0238* (2013.01); *B65G 2201/0258* (2013.01);
(Continued)

(58) Field of Classification Search
CPC combination set(s) only.
See application file for complete search history.

(56) References Cited

U.S. PATENT DOCUMENTS 5,000,643 A * 3/1991 Tanaka ............... B65G 1/06
                                                414/267
5,454,212 A * 10/1995 Tanaka ............... B65B 5/10
                                                53/252
(Continued)

FOREIGN PATENT DOCUMENTS

| DE | 10 2006 057266 A1 | 5/2008 |
|---|---|---|
| DE | 10 2008 061685 A1 | 6/2010 |

(Continued)

*Primary Examiner* — Kyle O Logan
(74) *Attorney, Agent, or Firm* — Jonathan A. Kidney; CKR Law LLP

(57) ABSTRACT

A system and method for a picking station operation, provides switched flexibly between single-step- and dual-step-picking into various types of order containers. The task is solved by the provision of a second order container conveyor technique for transporting second order containers, in particular boxes, for receiving articles into order container bays, arranged also in the arrangement row, of the picking station.

20 Claims, 2 Drawing Sheets

(52) U.S. Cl.
CPC ...... *B65G 2209/00* (2013.01); *B65G 2209/02* (2013.01); *B65G 2209/08* (2013.01)

(56) References Cited

U.S. PATENT DOCUMENTS

| | | | | |
|---|---|---|---|---|
| 7,766,151 B2* | 8/2010 | Schaefer | ................ | B65G 65/23 198/370.01 |
| 8,965,560 B2* | 2/2015 | Mathi | ................... | B65G 1/1376 700/213 |
| 9,511,940 B2* | 12/2016 | Schonenberger | ...... | B65G 17/20 |
| 2004/0079618 A1* | 4/2004 | Abildgaard | .......... | B65G 47/962 198/370.04 |
| 2006/0229762 A1* | 10/2006 | Schaefer | .............. | B65G 1/1378 700/216 |
| 2009/0136328 A1* | 5/2009 | Schafer | ................ | B65G 1/1378 414/273 |
| 2009/0139188 A1* | 6/2009 | Schafer | ................ | B65G 1/1378 53/474 |
| 2009/0299521 A1* | 12/2009 | Hansl | .................. | B65G 1/1373 700/215 |
| 2011/0203231 A1* | 8/2011 | Hortig | .................... | B65B 67/02 53/473 |
| 2014/0244026 A1 | 8/2014 | Neiser | | |
| 2014/0249666 A1* | 9/2014 | Radwallner | .......... | B65G 1/1378 700/216 |
| 2016/0107838 A1* | 4/2016 | Swinkels | ................ | B66F 9/063 414/273 |
| 2016/0130085 A1* | 5/2016 | Yamashita | ........... | B65G 1/1373 414/807 |
| 2016/0130086 A1* | 5/2016 | Yamashita | ........... | B65G 1/1378 414/807 |
| 2016/0194153 A1* | 7/2016 | Issing | .................. | B65G 1/1378 700/216 |
| 2016/0229633 A1* | 8/2016 | Yamashita | ........... | B65G 1/1378 |
| 2016/0355340 A1* | 12/2016 | Meurer | ................ | B65G 1/1378 |

FOREIGN PATENT DOCUMENTS

| | | |
|---|---|---|
| DE | 20 2012 100535 U1 | 7/2012 |
| EP | 2 098 464 A1 | 9/2009 |
| EP | 2098464 A1 | 9/2009 |
| EP | 2 607 271 A1 | 6/2013 |
| EP | 2607271 A1 | 6/2013 |
| JP | 2001 253515 A | 9/2001 |
| JP | 2001253515 A | 9/2001 |
| WO | 2011/120067 A2 | 10/2011 |

* cited by examiner

PICKING STATION FOR PICKING ARTICLES INTO ORDER CONTAINERS AND CONVEYOR BAGS FOR ORDER AND BATCH PICKING

CROSS-REFERENCE TO RELATED APPLICATION(S)

This application claims the benefit of PCT Application no. PCT/AT2016/060029 filed 17 Aug. 2016, claiming priority to Austrian Application no. GM 246/2015 filed 19 Aug. 2015, the contents of which are hereby incorporated by reference in their entirety.

FIELD

The invention relates to a picking station for picking articles from storage containers into order containers according to the good-to-person-principle having a storage container conveyor technique for transporting storage containers containing articles, in particular boxes, from a storage rack into at least two storage container bays, arranged in an arrangement row, of the picking station and having a picking area arranged along the arrangement row for a picking person or a picking robot and having a first order container conveyor technique arranged in a further arrangement row for transporting first order containers for receiving articles retrieved from the storage containers.

BACKGROUND

The document DE 10 2011 116 081 B3 discloses such picking station, at which a storage container conveyor technique transports storage containers to the working area of a picking person, whereupon the number of articles predetermined by a controlling devices is retrieved by the picking person from the storage container. The order container conveyer technique is formed by a suspension conveyor technique and delivers conveyor bags, whereupon the picking person puts the retrieved articles into the conveyor bags indicated by the controlling device. In this way, there is carried out a batch picking, in which the articles of several orders are put into a conveyor bag. In a subsequent buffering and sorting area, the conveyor bags are then temporarily stored and/or put into the correct ordering in order to pack the articles at a subsequent packing station into respectively one order container per order. Batch picking has the advantage that the storage container conveyor technique is relieved as the storage container of a certain type of article need not be removed and restored upon picking every single time but rather several articles of this type may be retrieved for several orders and may be picked as a batch into a conveyor bag.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

For orders having different requirements (e.g., sequencing requirements, article assortment, sorting criteria, order structure, etc.), a single-step or also a dual-step order picking may be more advantageous. The picking station known has the disadvantage that there is possible only batch-picking into conveyor bags.

The document DE 10 2010 010 305 B4 discloses a picking station, wherein the picking person stands in front of a plurality of storage containers and order containers formed by boxes, which are arranged similar to a display rack in a shop. A storage container conveyor technique transports storage containers to the picking station and places those, wherein there are contained fast moving articles, at particularly easily accessible positions in the first row, and those, wherein there are contains slow moving articles, at positions in the back rows of the picking station that are more difficult to access. An order container conveyor technique transports the order containers into the first row in order to enable the simple depositing of articles retrieved from the storage containers. In the document DE 10 2010 010 305 B4 there is mentioned that the picking station would also be suitable for batch picking, wherein articles of several orders would be placed into one box.

In this known picking station it has proven to be disadvantageous that the storage containers of slow moving articles are ergonomically difficult to reach by the picking person and that picking into conveyor bags is not possible.

Further order picking stations for picking articles from storage containers in order containers according to the good-to-person-principle are also known from the documents WO 2011/120067 A2 and US 2014/0244026 A1.

The invention is based on the task to provide a picking station, at which there may be switched flexibly between single-step- and dual-step-picking into various types of order containers. According to the invention, this task is solved by the provision of a second order container conveyor technique for transporting second order containers, in particular boxes, for receiving articles into order container bays, arranged also in the arrangement row, of the picking station.

In this way, there is obtained the advantage that in an arrangement that is ergonomically well-accessible it is possible to pick into first order containers arranged in the arrangement row as well as second order containers arranged in the further arrangement row. The term order container herein is to be interpreted in a broad sense in regard to the first order containers and does not comprise only boxes and conveyor bags but rather also an area reserved for an order on the order container conveyor technique, as already known from central belt picking, or a sorter belt having tilting trays. Depending on the configuration of the first and second order containers and the associated order container conveyor techniques, there is provided by the picking station high flexibility in regard to the type of picking.

It is advantageous if the first order container conveyor technique in the further arrangement row is formed by a suspension conveyor technique. In this way, there is enabled a dual-step picking or batch picking, respectively, into conveyor bags at the picking station. At the same picking station, there may be performed single-step picking, simultaneously or temporarily offset, from the storage containers into the second order containers, which are formed by boxes and are arranged immediately adjacent to the storage containers in the arrangement row. The simultaneous picking of "e-commerce orders" and "shop orders" at one picking station has the advantage that there may be used a high batch factor for picking into the conveyor bags.

It is also advantageous if the first order container conveyor technique is formed by a sorting belt having tilting trays, wherein the picking person puts the articles to be picked into a depositing area, from which the articles then slide into the tilting trays on the sorting belt. Controlled by a controlling device of the picking station, the tilting trays are tilted in time in order to have the article placed thereupon slide into an order container. In this way, there is ensured even higher flexibility for the type of picking.

It is further advantageous depending on the selected first and second order container conveyor technique and depending on the selected first and second order containers to have the controlling device of the picking station determine by means of which of the order container conveyor techniques an order picking and optionally also a batch picking is performed. There may, for example, be determined that at the picking station exclusively "batches" are picked into the conveyor bags of the first order container conveyor technique, wherein individual orders as well as "batches" are picked into the boxes of the second order container conveyor technique.

Further advantageous embodiments of the picking station according to the invention are explained in greater details in the following by way of the figures.

DETAILED DESCRIPTION

Figure 1:
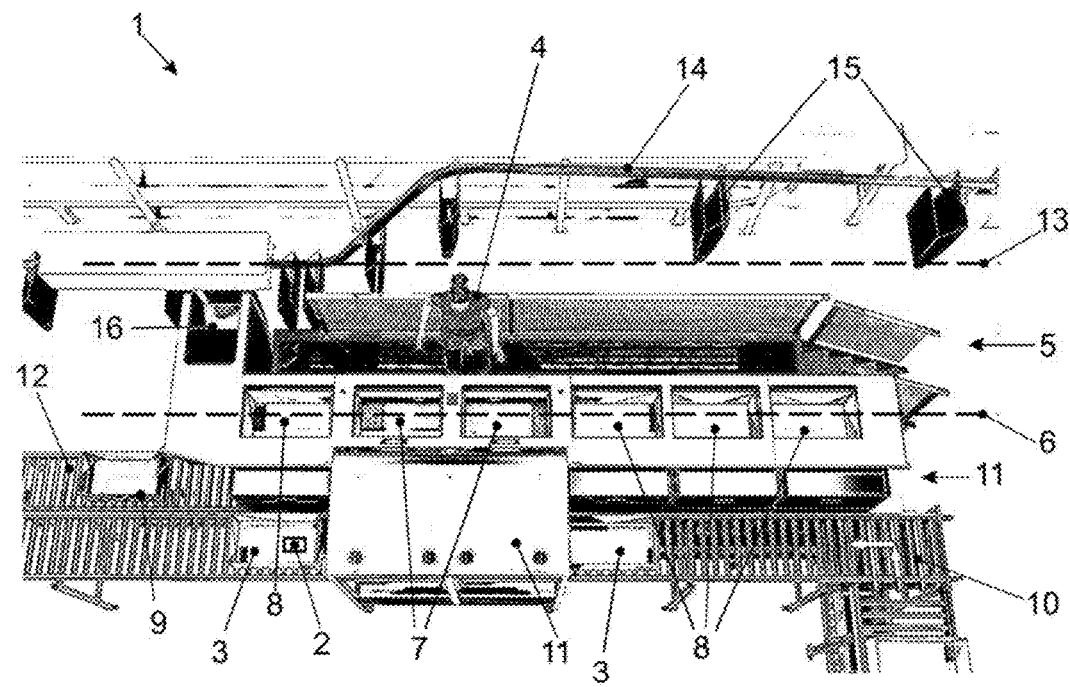
FIG. 1 shows a picking station according to a first embodiment example of the invention having a suspension conveyor technique as a first order container conveyor technique in an oblique view.

FIG. 1 shows a picking station 1 for picking articles 2 from storage containers 3 formed by boxes into order containers according to the good-to-person-principle. A picking person 4 may freely move in a picking area 5, which is formed by a corridor and slightly lifted from the ground, being easily accessible via stairs. In parallel to the corridor, there is situated an arrangement row 6, in which there are provided two storage container bays 7 for accommodating storage containers 3 and four order container bays 8 for accommodating second order containers 9 formed by boxes.

Figure 2:
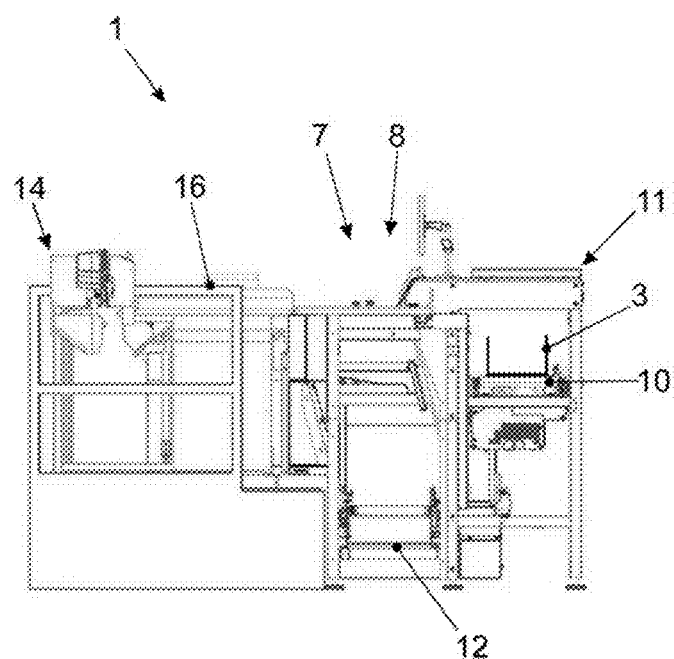
FIG. 2 shows the picking station according to FIG. 1 in a sectional side view.

The picking station 1 is provided in a picking system not depicted in greater details, having an article storage system for storing the articles 2 provided in the storage containers 3. Controlled via a controlling computer, the storage containers 3 with articles 2 required for picking are transported by a storage container conveyor technique 10 from the article storage system to the picking station 1. The storage container conveyor technique 10 is formed according to this embodiment example by a roller conveyor, in an article storage system having articles stored suspended such as clothes, however, it may also be formed by a suspension conveyor technique. The storage container conveyor technique 10 transports the storage containers 3 in manipulation means 11 of the picking station 1, which is depicted in FIG. 2 in a sectional side view. The manipulation means 11 transport the storage container 3 in the direction of the picking person 4 into one of the storage container bays 7 in order to enable an ergonomical retrieval of the article 2 to be picked by the picking person 4. After picking, the manipulation means 11 transport the storage container 3 again out of the storage container bay 7, and the storage container conveyor technique 10 transports the storage container 3 again back into the article storage system.

The picking station 1 further has a second order container conveyor technique 12 formed by a roller conveyor, which is configured to transport the second order containers 9 formed by boxes. A second order container 9 assigned to one or several orders is transported by the order container conveyor technique 12 into the manipulation means 11 and pushed by the manipulation means 11 underneath one of the order container bays 8 and lifted by a container lifting device of the manipulation means 11 up to the working height of the picking person 4. In this way, it is made possible to put the article 2 to be picked into the second order container 9 in an ergonomical way.

As visible by way of FIG. 2, the storage container conveyor technique 10 is arranged on a level above the second order container conveyor technique 12. In this way, there is obtained the advantage that the picking station 1 may be realized in an especially space-saving manner. For this reason, it would further be possible to arrange the storage container conveyor technique 10 on a level underneath the second order container conveyor technique 12.

The picking station 1 now has a first order container conveyor technique arranged along the picking area 5 opposite to the arrangement row 6 in a further arrangement row 13 for transporting first order containers for receiving articles 2 retrieved from the storage containers 3. The first order container conveyor technique, according to the first embodiment example of the invention, is formed by a suspension conveyor technique 14, by means of which the conveyor bags 15 are transported as first order containers. In this way, there is obtained the advantage that articles 2 retrieved from the storage containers 3 may be picked into a conveyor bag 15 as well as into a second order container 9 formed by a box.

The picking station 1 further has a depositing area 16 as an end of the picking area 5 between the arrangement row 6 and the further arrangement row 13, wherein articles 2 picked onto the depositing area 16 are transferred into conveyor bags 15 of the suspension conveyor technique 14 and in particular slide into the conveyor bags 15. In this way, there is obtained a particularly easy and reliable type of transfer of the picked article 2 into the conveyor bag 15.

Figure 3:
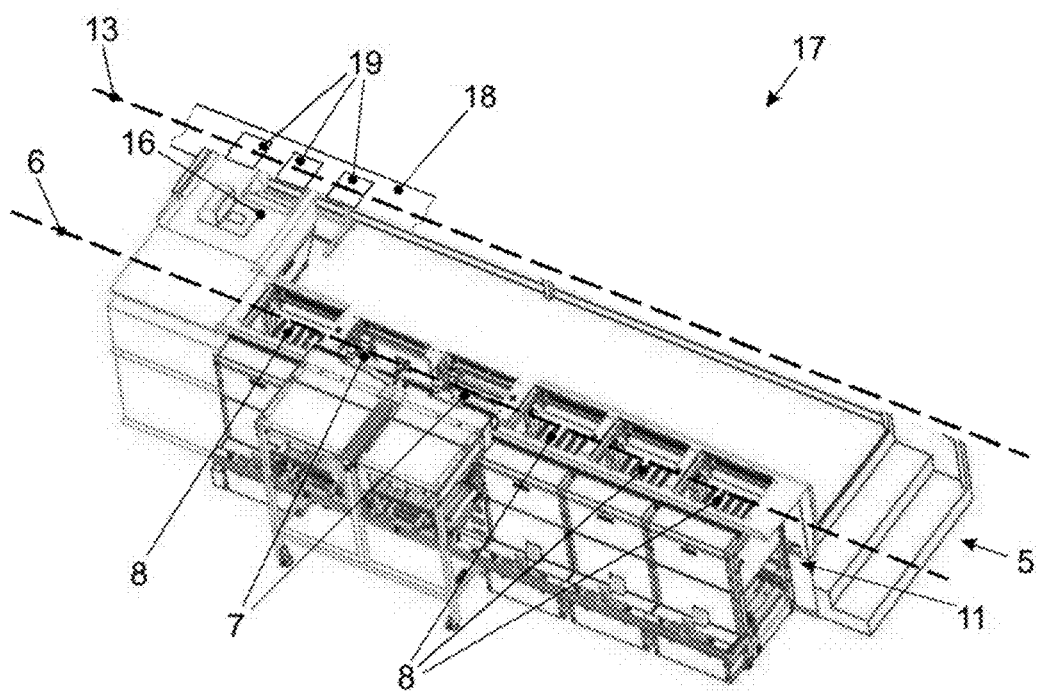
FIG. 3 shows a picking station according to a second embodiment example of the invention having a sorting belt with tilting trays as a first order container conveyor technique in an oblique view.

FIG. 3 shows a picking station 17 according to a second embodiment example of the invention having a sorting belt 18 with tilting trays 19 as a first order container conveyor technique in an oblique view. Apart from the order container conveyor technique, the picking station 17 corresponds to the picking station 1 described by way of the FIGS. 1 and 2. The articles 2 picked onto the depositing area 16 slide, one by one, onto respectively one sorting member 19, which may be formed by tilting tray, a transverse belt, a trap board or similar, and are transported by the sorting belt 18. Along the sorting belt 18, there are provided order containers not depicted in FIG. 3, onto which the articles 2 picked onto the sorting members 19 are transferred by a controlling device of the picking station 17 by timely triggering the sorting members 19. In this way, there is obtained the advantage that at the picking station 17 there may picked, depending on the type of the article 2 and the order, either via the sorting members 19 into order containers or directly into second order containers 9 in the order container bays 8.

Due to the multiple possibilities for picking at the picking stations 1 and 17, the controlling device of the picking stations 1 or 17 may be configured to perform a pure order picking or a batch picking into first order containers or into second order containers. As the picking orders of the shops and customers may change dependent on the time of the day, there may be responded to the current workload of the conveyor techniques and picking stations in order to obtain a through-put of picking orders as high as possible in the entire picking system.

The picking person may also be substituted by a picking robot, using which the tasks of the picking person may be performed. Such picking robots have been known for a long time to those skilled in the art, which is why this will not be explained herein in greater detail.

There is to be noted that the picking station may be used particularly advantageously for processing retour goods or returned articles, respectively. The controlling device of the picking station recognizes storage containers, in which returned articles are supplied to the picking station, or it contains appropriate information from the higher-level controlling device of the picking system. Articles are designated as retour goods or returned articles, if they have already been picked once as an order but have been returned or delivered by the client as not-desired. Retour goods may be stored in storage containers back into the article storage system until these are again required for a picking order and are again retrieved from the article storage system to the picking station. It is, however, especially advantageous to supply returned articles in a storage container to the picking station and to pick these for temporary storage at the picking station into first order containers and/or second order containers. In this way, returned articles may, for example, be retrieved at the picking station from the storage container and placed into a conveyor bag, which is then temporarily stored in a matrix or root sorter as a dynamic intermediate buffer. If such a returned article in the conveyor bag is required for a picking order, then the conveyor bag may be transported with the returned article to the packing location and the returned article may be placed into the order container directly at the packing location, or the conveyor bag may be transported with the returned article also to the picking station and then the returned article may be picked there into the order container. In this way, there is effected an especially effective processing of retour goods, without further strain on the storage container conveyor technique and the article storage system.

According to a further embodiment example of the invention that is not depicted in the figures, the first order container conveyor technique would be formed by a suspension conveyor technique, which, however, compared to the suspension conveyor technique 14 depicted in FIG. 1, would be arranged rotated about 90 degrees. The further arrangement row would, according to this embodiment example, thus be essentially vertical to the arrangement row. The suspension conveyor technique would transport conveyor bags to a depositing area that is also rotated about 90 degrees and it would further transport the conveyor bags after filling with the picked articles via the storage container conveyor technique and the second order container conveyor technique. Further possible would be an inverted transport direction of the suspension conveyor technique or an arrangement of the arrangement row and the further arrangement row at another angle of, for example, 45 degrees. The arrangement of the further arrangement row essentially vertical or inclined to the arrangement row has the advantage of providing higher flexibility in order to integrate the picking station into the entire picking system in a space-saving manner.

There is to be noted that the storage container conveyor technique and the second order container conveyor technique are to be understood as being arranged in the arrangement row within the frame of the description of this invention even if these conveyor techniques are arranged only insignificantly parallel and offset to each other.

What is claimed is:

1. A picking station for picking articles from storage containers into order containers according to the good-to-person-principle, comprising:
    a storage container conveyor technique for transporting storage containers containing articles, in particular boxes, from a storage rack into at least two storage container bays, arranged in an arrangement row, of the picking station;
    a picking area arranged along the arrangement row for a picking person or a picking robot;
    a first order container conveyor technique arranged in a further arrangement row for the transport of first order containers for receiving articles retrieved from the storage containers;
    a second order container conveyor technique for the transport of second order containers, in particular boxes, for receiving articles into order container bays, also arranged in the arrangement row, of the picking station,
    wherein the first order container conveyor technique is formed by a sorting belt having tilting trays or a suspension conveyor technique having conveyor bags.

2. The picking station according to claim 1, wherein the further arrangement row along the picking area is provided approximately opposite to the arrangement row and that, in this way, the two arrangement rows and the picking area are provided approximately in parallel to each other.

3. The picking station according to claim 1, wherein the further arrangement row is provided approximately vertically to the picking area and the arrangement row, which are arranged approximately in parallel to each other.

4. The picking station according to claim 1, wherein for the first order container conveyor technique formed by the suspension conveyor technique, there is provided a depositing area as an end of the picking area between the arrangement row and the further arrangement row, wherein articles picked onto the depositing area slide into the conveyor bags of the suspension conveyor technique.

5. The picking station according to claim 1, wherein for the first order container conveyor technique formed by the sorting belt, there is provided a depositing area as an end of the picking area between the arrangement row and the further arrangement row, wherein articles picked onto the depositing area slide into respectively one tilting tray of the sorting belt.

6. The picking station according to claim 1, further comprising, a controlling device for predetermining the article to be picked by the picking person or the picking robot, wherein the order containers of the first order container conveyor technique are used for batch picking and/or order picking and wherein order containers of the second order container conveyor technique are exclusively used for batch picking.

7. The picking station according to claim 1, further comprising, a controlling device for predetermining the articles to be picked by the picking person or the picking robot, wherein the order containers of the first order container conveyor technique are exclusively used for order picking and wherein order containers of the second order container conveyor technique are used for batch picking and/or order picking.

8. The picking station according to claim 1, wherein the storage container conveyor technique is provided on a level above the second order container conveyor technique.

9. The picking station according to claim 8, wherein there is provided in the area of the at least one order container bay above the second order container conveyor technique and/or in the area of the at least one storage container bay above the storage container conveyor technique, a container lifting device to lift order containers and/or storage containers up to a working height of the picking area for picking or to drop onto the second order container conveyor technique and/or the storage container conveyor technique after picking, respectively.

10. The picking station according to claim 1, further comprising, a controlling device for controlling the processing of retour goods, wherein articles already picked once are supplied to the picking station in a storage container and picked for temporary storage at the picking station into first order containers and/or second order containers.

11. The picking station according to claim 2, wherein for the first order container conveyor technique formed by the suspension conveyor technique, there is provided a depositing area as an end of the picking area between the arrangement row and the further arrangement row, wherein articles picked onto the depositing area slide into the conveyor bags of the suspension conveyor technique.

12. The picking station according to claim 3, wherein for the first order container conveyor technique formed by the suspension conveyor technique, there is provided a depositing area as an end of the picking area between the arrangement row and the further arrangement row, wherein articles picked onto the depositing area slide into the conveyor bags of the suspension conveyor technique.

13. The picking station according to claim 2, wherein for the first order container conveyor technique formed by the sorting belt, there is provided a depositing area as an end of the picking area between the arrangement row and the further arrangement row, wherein articles picked onto the depositing area slide into respectively one tilting tray of the sorting belt.

14. The picking station according to claim 3, wherein for the first order container conveyor technique formed by the sorting belt, there is provided a depositing area as an end of the picking area between the arrangement row and the further arrangement row, wherein articles picked onto the depositing area slide into respectively one tilting tray of the sorting belt.

15. The picking station according to claim 2, further comprising, a controlling device for predetermining the article to be picked by the picking person or the picking robot, wherein order containers of the first order container conveyor technique are used for batch picking and/or order picking and wherein order containers of the second order container conveyor technique are exclusively used for batch picking.

16. The picking station according to claim 2, further comprising, a controlling device for predetermining the articles to be picked by the picking person or the picking robot, wherein the order containers of the first order container conveyor technique are exclusively used for order picking and wherein order containers of the second order container conveyor technique are used for batch picking and/or order picking.

17. The picking station according to claim 2, wherein the storage container conveyor technique is provided on a level above the second order container conveyor technique.

18. The picking station according to claim 2, further comprising, a controlling device for controlling the processing of retour goods, wherein articles already picked once are supplied to the picking station in a storage container and picked for temporary storage at the picking station into first order containers and/or second order containers.

19. The picking station according to claim 3, further comprising, a controlling device for controlling the processing of retour goods, wherein articles already picked once are supplied to the picking station in a storage container and picked for temporary storage at the picking station into first order containers and/or second order containers.

20. The picking station according to claim 4, further comprising, a controlling device for controlling the processing of retour goods, wherein articles already picked once are supplied to the picking station in a storage container and picked for temporary storage at the picking station into first order containers and/or second order containers.

* * * * *